W. W. CURTIS.
COMBINED PLOW AND PULVERIZING MACHINE.
APPLICATION FILED APR. 15, 1912.
1,070,423.
Patented Aug. 19, 1913.
4 SHEETS—SHEET 1.
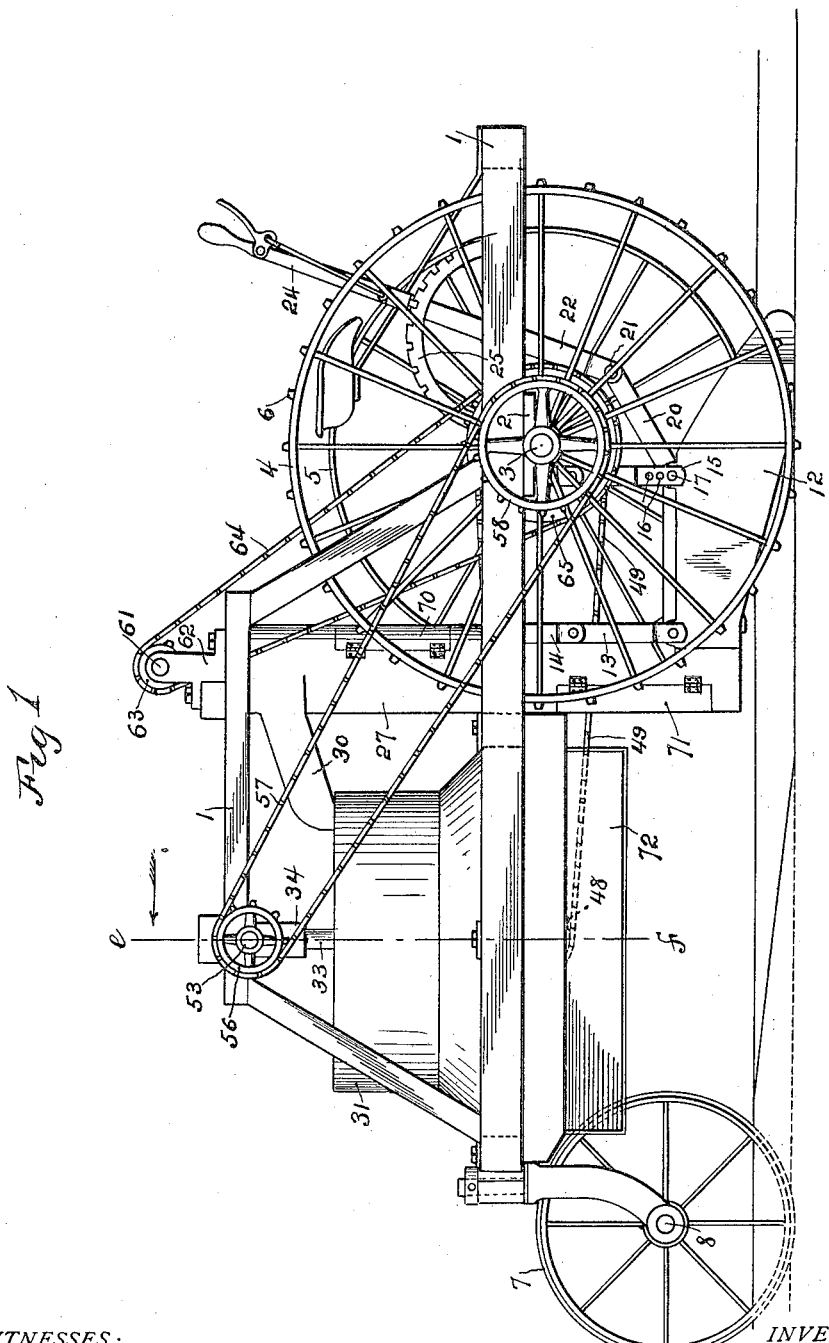
WITNESSES:
R. E. Hamilton
E. B. House.
INVENTOR.
William W. Curtis
BY Warren D. House
His ATTORNEY.

W. W. CURTIS.
COMBINED PLOW AND PULVERIZING MACHINE.
APPLICATION FILED APR. 15, 1912.
1,070,423.
Patented Aug. 19, 1913.
4 SHEETS—SHEET 2.
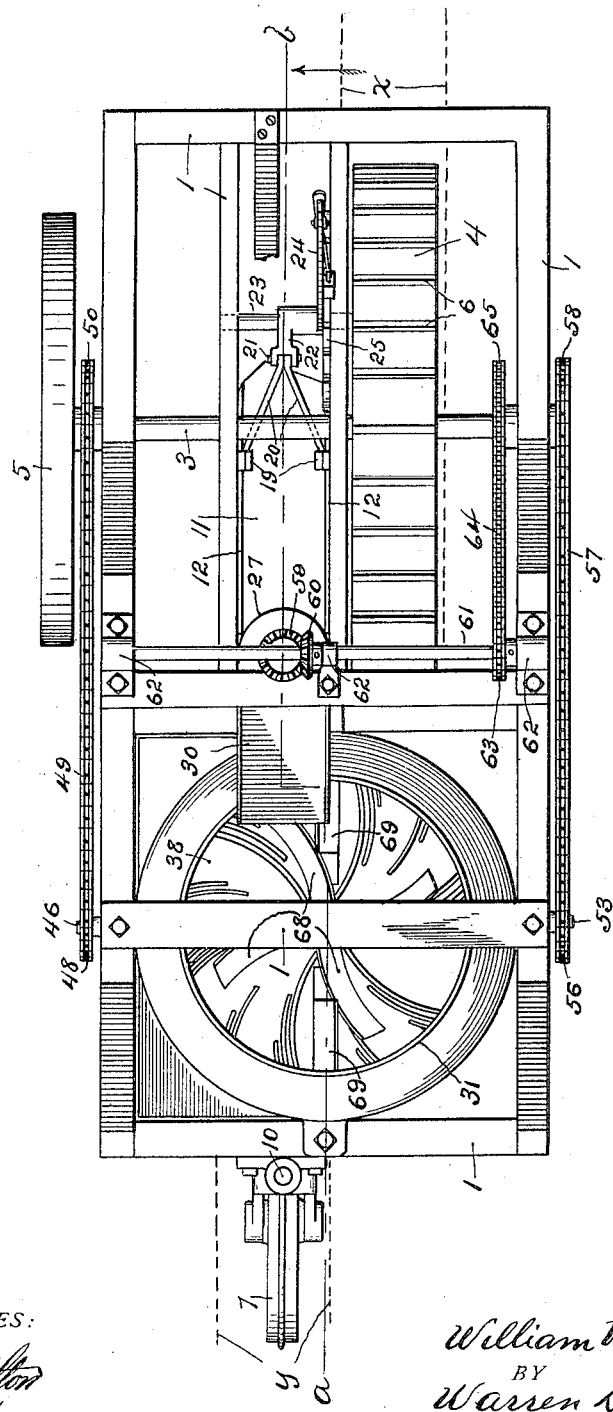

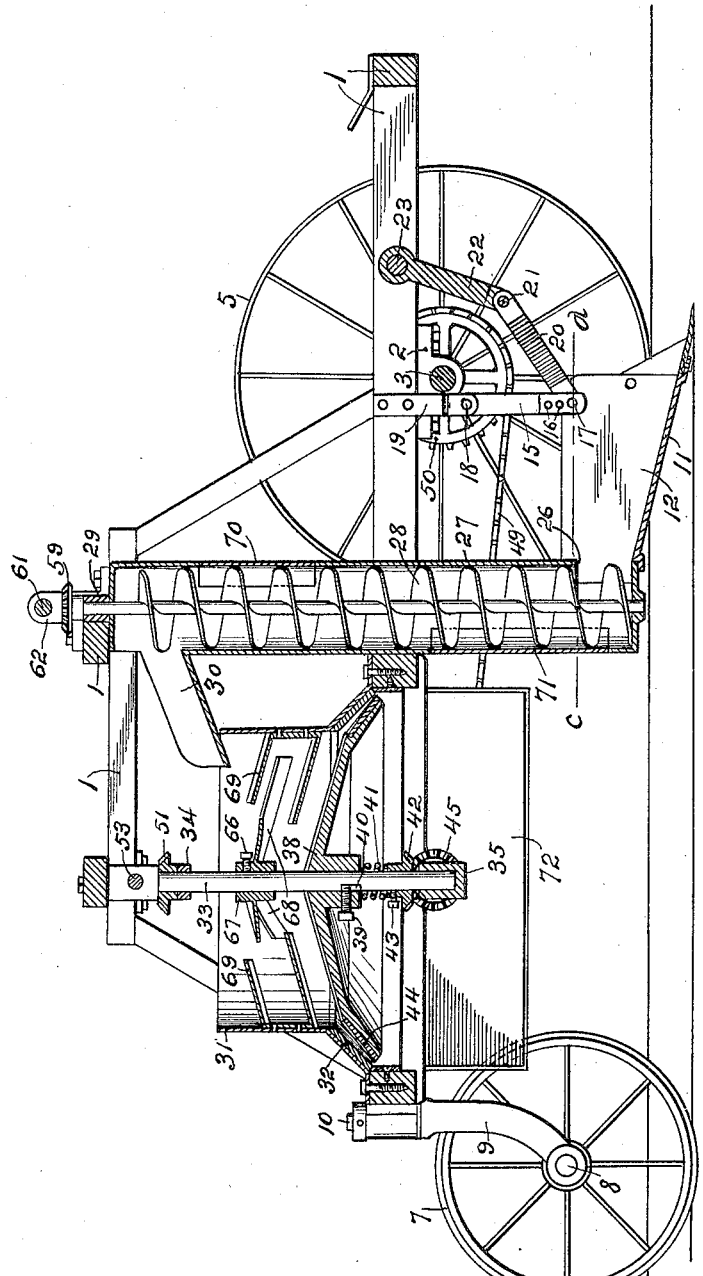

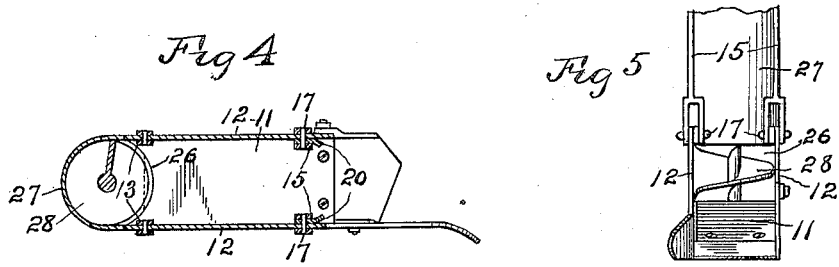
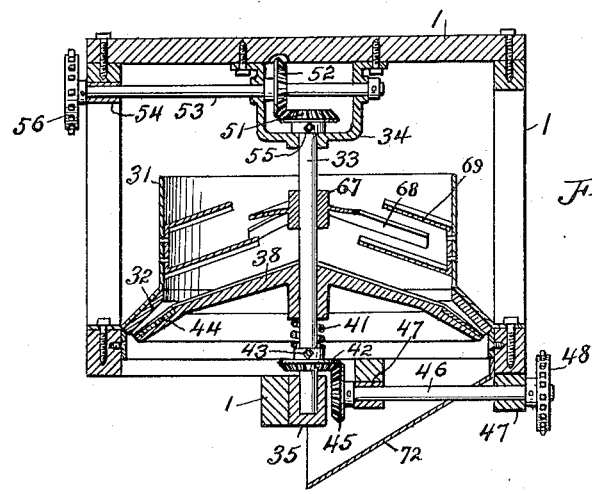
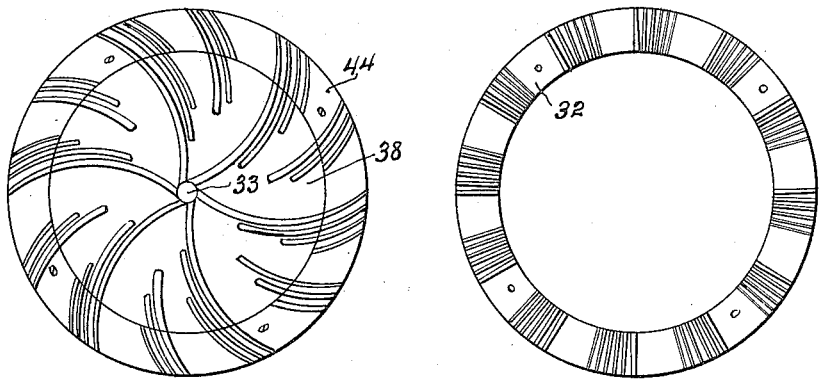
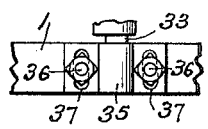

UNITED STATES PATENT OFFICE.

WILLIAM W. CURTIS, OF INDEPENDENCE, MISSOURI, ASSIGNOR OF ONE-HALF TO EMSLEY CURTIS, OF INDEPENDENCE, MISSOURI.

COMBINED PLOW AND PULVERIZING-MACHINE.

1,070,423.   Specification of Letters Patent.   Patented Aug. 19, 1913.

Application filed April 15, 1912. Serial No. 690,790.

*To all whom it may concern:*

Be it known that I, WILLIAM W. CURTIS, a citizen of the United States, and a resident of Independence, in the county of Jackson and State of Missouri, have invented a certain new and useful Improvement in Combined Plows and Pulverizing-Machines, of which the following is a specification.

My invention relates to improvements in combined plows and pulverizing machines.

One object of my invention is to provide a machine with which the ground may be finely pulverized and quickly and economically placed in condition for planting.

A further object of my invention is to provide a machine with which bugs, worms, and grass and weed seeds may be destroyed at the same time and by the same means with which the ground is placed in condition for planting.

My invention is particularly adapted for the purpose of destroying bur seeds, such as the seed of the cockle bur.

My invention provides a machine by which the earth is plowed and finely pulverized at one operation.

In the accompanying drawings which illustrate the preferred form of my invention, Figure 1 is a side elevation of my improved machine shown in the operative position. Fig. 2 is a plan view of the machine, the new and last furrows which have been plowed being shown in dotted lines. Fig. 3 is a vertical section on the line *a—b* of Fig. 2. Fig. 4 is a cross section on the line *c—d* of Fig. 3. Fig. 5 is a front view of the plow and a portion of the conveyer casing. Fig. 6 is a vertical section on the line *e—f* of Fig. 1. Fig. 7 is a plan view of the lower pulverizing member. Fig. 8 is a bottom view of the upper pulverizing member. Fig. 9 is a side elevation of the lower end of the shaft carrying the lower grinding member and the bearing in which said shaft is supported.

Similar reference characters designate similar parts in the different views.

1 designates a carrying frame of any suitable form and having bearings 2 in which is rotatively mounted a horizontal axle 3 to which are secured two carrying wheels 4 and 5. The wheel 4 is a driving wheel the periphery of which is preferably provided with teeth 6. The wheel 4 is preferably of greater diameter than the wheel 5, as the wheel 4 is designed to run in a furrow, while the wheel 5 is designed to run on the unplowed ground. The carrying frame is provided also with a third wheel 7 rotatively mounted on an axle 8 fixed in the lower end of a fork 9, the upper end of which has a vertical shank 10 pivoted in the body of the frame to the rear of and between the wheels 4 and 5 and in alinement with the plow comprising a shear 11 and two landsides 12 located, preferably between the wheels 4 and 5. Pivotally secured at their lower ends to the rear ends of the land sides 12 respectively are two vertical links 13 the upper ends of which are respectively pivoted to two depending bars 14 secured to the frame 1.

Two links 15 are provided each at their lower ends with a longitudinal row of holes 16 each adapted to receive a horizontal bolt 17. The bolts 17 respectively extend through holes provided respectively in the landsides 12 adjacent the forward ends thereof. The upper ends of the links 15 are pivoted by horizontal bolts 18 to bars 19 respectively which are secured to the frame 1. By placing the bolts 17 in different holes 16 the forward end of the share 11 may be vertically adjusted so as to plow furrows of different depths.

In order that the plow may be swung so as to clear the shear 11 clear of the ground, the following mechanism is provided. Two bars 20 have their lower ends pivoted respectively to the bolts 17. The upper ends of said bars 20 are pivoted by a horizontal bolt 21 to one arm 22 of a lever which has a pivotal support on a horizontal bar 23 mounted in the frame 1. The other arm 24 of said lever carries suitable means for releasably locking said arm to an arcuate notched plate 25 secured to the frame 1.

The rear open end of the plow is adapted to discharge the earth plowed up by it into an opening 26 of a vertical casing 27 of a conveyer mechanism. Rotatively mounted in the casing 27 is a screw 28, the lower end of which is rotatively mounted in the lower end of the casing 27 and the upper end of which is rotatively mounted in a bearing 29 secured to the frame 1. The upper end of the casing 27 is provided with a rearwardly inclined chute 30 which discharges into a hopper 31 of a pulverizing mechanism. The hopper 31 is secured to the frame 1 and has a lower flaring end to the inner side of which is secured an annular ribbed grinding or pulverizing plate or member 32. Extending axially through the hopper 31 is a rotary vertical shaft 33 the upper end of which is rotatively mounted in a bracket 34 secured to the frame 1. The lower end of the shaft 33 is rotatively mounted in a bearing 35 secured to the frame 1 by means of bolts 36 mounted in vertical slots 37 provided in the bearing 35. A conical pulverizing lower member 38 is vertically adjustable on the shaft 33 and has mounted in it a set screw 39 the inner end of which is mounted in a longitudinal groove 40 provided, as shown in Fig. 3 in the shaft 33. The member 38 is normally forced upwardly into the operative position by a coil spring 41 which encircles the shaft 33 and has its lower end bearing against a bevel gear wheel 42 secured on the shaft 33 by a set screw 43. The set screw 39 by striking the upper end of the groove 40 limits the upward movement of the member 38. The upper side of the member 38 is ribbed and is provided near its periphery with an annular ribbed ring 44 spaced apart from the ribbed member 32 with which it coöperates to pulverize earth discharged into the hopper 31 from the chute 30.

Meshing with the bevel gear wheel 42 is a bevel gear wheel 45 which is secured to a horizontal shaft 46 rotatively mounted in bearings 47 secured to the frame 1. Secured to the shaft 46 is a sprocket wheel 48 which is connected by a chain belt 49 with a sprocket wheel 50 secured to the axle 3. Secured to the shaft 33 adjacent to its upper end is a bevel gear wheel 51 which meshes with a bevel gear wheel 52 secured to a horizontal shaft 53 rotatively mounted in the bracket 34 and in a bearing 54 secured to the frame 1. The bevel gear wheel 51 is secured to the shaft 33 by a set screw 55. By loosening the set screws 55 and 43, the shaft 33 may be vertically adjusted with the member 38 to change the degree of fineness with which the earth is pulverized. The spring 41 serves as a yielding support for the member 38, so that when a rock or unbreakable substance passes between the grinding members 32 and 44, the member 38 will yield so as to permit the hard substance to be discharged without injury to the parts. Secured to the shaft 53 is a sprocket wheel 56 which is connected by a chain belt 57 with a sprocket wheel 58 secured on the axle 3. To rotate the screw 28 it has secured to its upper end a bevel gear wheel 59 which meshes with a bevel gear wheel 60 which is secured to a horizontal shaft 61 rotatively mounted in the bearing 29 and in a bearing 62 secured to the frame 1. Secured to the shaft 61 is a sprocket wheel 63 which is connected by a chain belt 64 with a sprocket wheel 65 secured to the axle 3. Secured by a set screw 66 on the shaft 33 is a hub 67 having radial beater arms 68 adapted to pass between inwardly extending arms of U shaped brackets 69 which are secured to the inner wall of the hopper 31 above the member 38. The arms 68 coöperate with the arms of the brackets 69 to break up lumps of earth entering the hopper 31, so that such lumps will be separated into portions small enough to pass between the grinding members 32 and 44. Doors 70 and 71 normally close two openings provided respectively in the forward and rear sides of the casing 27 adjacent to the upper and lower ends thereof. By opening these doors access may be had to the interior of the conveyer casing. The wheel 7 is disposed so as to track in the furrow made by the plow, the driving wheel 4 being disposed so as to track in the furrow last made by the plow and indicated in dotted lines $x$ in Fig. 2, the furrow in which the wheel 7 runs being represented by the dotted lines $y$ in Fig. 2.

Any suitable means may be employed to propel the machine. For distributing the pulverized earth in the furrow in which the driving wheel 4 is running, I provide a chute 72 which is secured to the frame 1 and has its mouth disposed so as to discharge the pulverized earth to the rear of the wheel 4 and laterally to the right of the furrow which is being made at the time by the plow.

In operating my invention, the machine is propelled forwardly, that is to the right as viewed in Figs. 1, 2 and 3, and the lever arm 24 is swung so as to permit the plowshare 11 to drop to the position shown in Fig. 3. and in Fig. 1.

As the machine moves forwardly the shear 11 will cut a furrow and the earth will be deposited in the lower end of the casing 27 through which it will be carried upwardly by the screw 28 and discharged by the chute 30 into the hopper 31. The lumps of earth will be broken by the arms 68 and brackets 69 and will be deposited between the grinding members 32 and 44 between which the earth will be finely pulverized, after which the pulverized material will fall into the chute 72 and by it be deposited on the ground at the rear of the driving wheel 4 and in the furrow in which such wheel is running. The turning of the wheels 4 and 5 and axle 3 will cause the screw 28, and member 38 to be rotated by means of the mechanism hereinbefore described.

The worms, bugs, burs of grass and weeds contained in the ground which is plowed and pulverized by the machine will be destroyed during the pulverizing operation, as will be seeds of grass and weeds, and the earth, after being so treated, will be in suitable condition for planting. By the use of my machine the cost of working the ground will be materially reduced and the ground will be placed in much better planting condition than is the case with ground treated in the usual manner.

I do not limit my invention to the structure shown and described, as modifications, within the scope of the appended claims, may be made without departing from the spirit of my invention.

Having thus described my invention, what I claim and desire to secure by Letters Patent, is:—

1. In a combined plow and pulverizing machine, a wheeled carrying frame having a driving wheel, a plowing means carried by the frame and arranged to plow a furrow at one side of the driving wheel, pulverizing means carried by the frame, means actuated by said wheel for operating the pulverizing means, means for conveying plowed earth from the plow to the pulverizing means, and distributing means for discharging the pulverized earth to one side of said furrow.

2. In a combined plow and pulverizing machine, a wheeled carrying frame having a driving wheel, plowing means arranged to plow a furrow at one side of said wheel, pulverizing means, means actuated by the said wheel for operating the pulverizing means, means for conveying plowed earth from the plow to the pulverizing means, and distributing means for discharging the pulverized earth to one side of said furrow and to the rear of said wheel.

In testimony whereof I have signed my name to this specification in presence of two subscribing witnesses.

WILLIAM W. CURTIS.

Witnesses:
WARREN D. HOUSE,
E. B. HOUSE.

---

Copies of this patent may be obtained for five cents each, by addressing the "Commissioner of Patents, Washington, D. C."